United States Patent Office 2,930,263
Patented Mar. 29, 1960

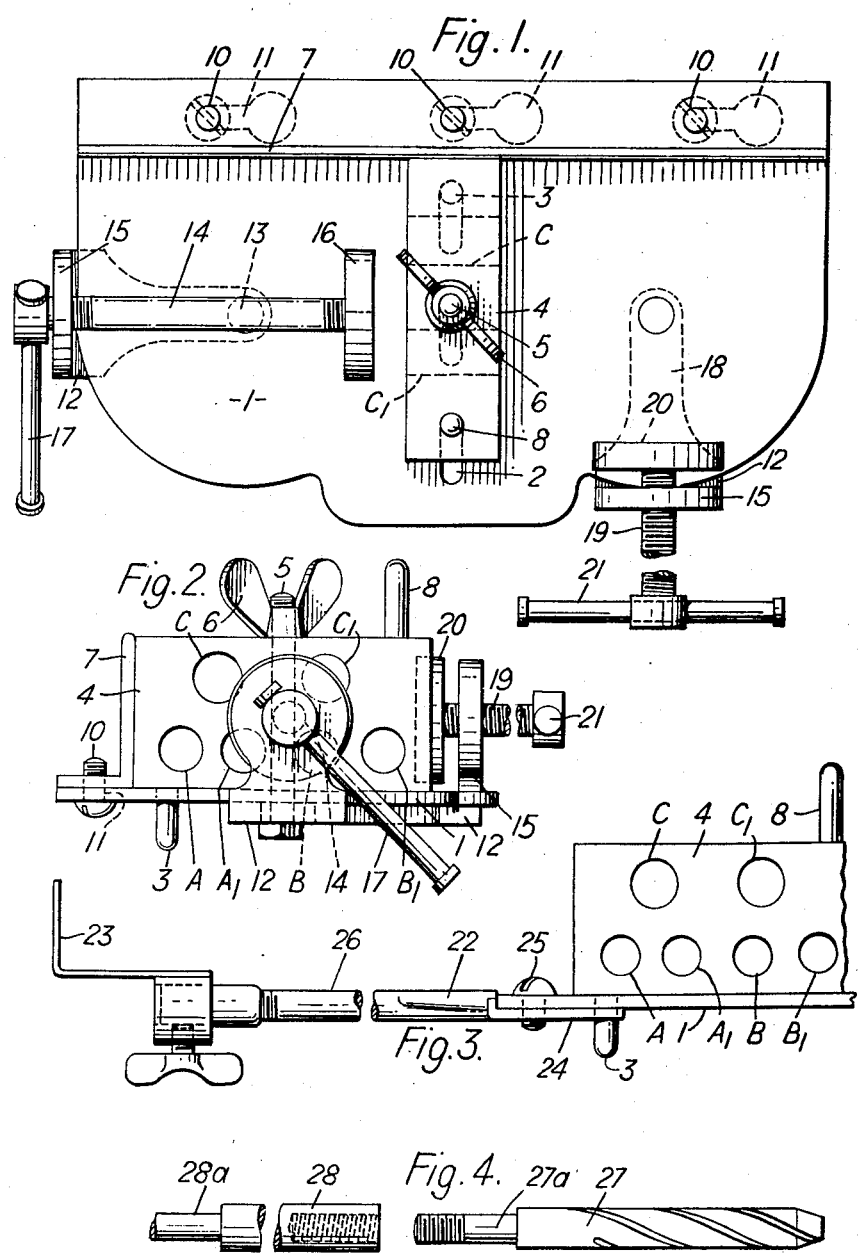

2,930,263

DOWEL JIGS

Eurgain Jones, Barry, Glamorgan, Wales

Application March 17, 1958, Serial No. 721,737

3 Claims. (Cl. 77—62)

This invention relates to dowel jigs for use by carpenters and other workers in wood.

It is an object of the invention to provide a dowel jig which can be made of relatively small dimensions and weight and which will facilitate the work of carpenters in the making of, inter alia, window and door frames of normal sizes.

According to the invention a dowel jig comprises a base adapted to support an article which is to receive a dowel hole, a stop projecting upwards from the plane of the base and a tool support which is arranged together with the stop and the base to provide three surfaces adapted accurately to locate a work piece in relation to an opening for a tool in the tool support.

According to a further feature of the invention, the jig comprises means for clamping a work piece to the jig, the said means being adjustable from a position in which it is adapted to hold a work piece against the stop to a position in which it is adapted to hold the work piece against the tool support.

The invention is illustrated by way of example in the accompanying drawings in which:

Fig. 1 is a plan view of a dowel jig embodying the invention.

Fig. 2 is a side elevation.

Fig. 3 is a fragmentary side elevation showing a modified form of stop and

Fig. 4 shows a tool construction which is especially suitable for use with the jig provided by the invention.

Referring to the accompanying drawings, a base 1 is provided with a slot 2 in which a guide pin 3, which depends from a tool support 4, is adapted to move. The tool support 4 is a block which is bored to receive a number of cylindrical tools such as twist drills and, in order that any particular bored opening should be accurately positioned as required by any particular dowelling operation, the support is releasably clamped to the base 1 by a bolt 5 and a wing nut 6. When the nut 6 is slackened, the support can be slid endwise, that is towards and away from a stop rail 7, to a desired position and there again clamped. The support is also provided with a guide pin 8 which projects vertically, as shown in Fig. 1, and this pin can be placed in the slot 2 when the nut 6 has been removed from the bolt 5 and the tool support 4 has been inverted. The support 4 may also be reversed, that is turned end to end, with either the guide pin 3 or 8 in the slot 2.

The stop rail 7 is held to the base 1 by three headed screws 10 which each engage in a keyhole shaped opening 11, shown in broken lines in Fig. 1, so that the rail 7 can be readily mounted on and detached from the base. Clamping means for holding a work piece in position for making a dowelling hole comprises an arm 12 which is pivotally mounted on the base, on the left hand side of the support 4 as seen in Fig. 1, by a pivot 13. A screw-threaded bolt 14 engages in an upwardly projecting portion 15 of the arm 14 and carries a clamping disc 16 at one end and a handle 17 at the other. A similar arm 18, bolt 19, clamping disc 20 and handle 21 are mounted on the right hand side of the tool support 4 as shown in Fig. 1. With the clamping devices positioned as shown in Fig. 1, a work piece, for example a side member of a window frame, not shown, may be placed on the left hand side of the support 4, with its end abutting on the stop rail 7, and clamped in place. A drill placed in the appropriate opening in the support 4 can then be used to drill a dowel hole or holes in the side member. The transverse frame member which is to be joined to the side member is then placed, after the side member has been removed from the jig, on the right hand side of the tool support 4 with its end abutting on this support. A dowel hole or holes are then drilled in the end face of the transverse member. Usually, a pair of adjacent dowel holes are drilled in one face at a time and the tool openings in the tool support 4 are shown arranged in pairs $AA_1$, $BB_1$ and $CC_1$ the openings of each pair having a diameter differing from that of the openings of each of the other pairs. Register of the dowel holes thus made in the different frame members is obtained with great accuracy and the jig enables door and other frames to be made and assembled with ease, no trimming of the abutting surfaces at a joint being necessary. The jig can be made small enough to be held in one hand while a dowel hole is being drilled by a power-drill held in the other hand. When a dowel hole has to be drilled intermediate the ends of, say, a side member of an already partly completed frame, not shown, for example for the purpose of making a shelf, the stop rail 7 is removed and a rod 22 of adjustable length is fastened to the base 1 in its place. The rod 22 carries a comparatively light stop rail 23 which is adapted to be placed against an end member of the frame with the jig so placed that the tool support 4 is adjacent to the position on the side member of the frame which is to be drilled. The rod 22 as shown comprises a tongue 24 which carries a headed screw 25 which is adapted to engage and be screwed in the middle one of the holes 11 in the base. Any number of rod lengths 26 may be secured together by screw-threaded engagements to make a rod of a desired length or a telescopic rod may be used, suitable means being provided to lock the telescopic rod against endwise movement after it has been adjusted.

Packing shims, not shown, may be placed under the tool support 4 in order to adjust the height of the support.

The tool 27 in Fig. 4 is especially suitable for use with the jig. This tool has its shank 27a turned down and screw-threaded so that this shank can be engaged tightly in a sleeve 28 with the free end of the shank clear of any transverse surface in the sleeve. The sleeve 28 has a shank 28a which can be engaged in the chuck of a small power drill.

Fiducial lines may be marked on the edges of the support 4 to indicate the positions of the centres of the openings $AA_1$, $BB_1$, and $CC_1$.

I claim:

1. A dowel jig which comprises a base adapted to support an article which is to receive a dowel hole, a stop projecting upwards from the plane of the base and having a stop surface extending in a plane normal to and parallel with a rear edge of the base, a tool support having at least one bore extending through the support parallel with the said stop surface for the reception of a tool, the said tool support being located between portions of the base each adapted to support the work piece so that the support together with the stop and the base provide three surfaces located on each of opposite sides of the support for locating a work piece in relation to a tool receiving bore in the support, clamping means on each side of the tool support and means pivotally connecting each clamping means with the base for movement thereof through a right angle whereby each clamping means is adapted to press a work piece in turn against the stop surface and the tool support.

2. A dowel jig which comprises a base adapted to support an article which is to receive a dowel hole, a stop projecting upwards from the plane of the base and having a stop surface extending in a plane normal to and parallel with a rear edge of the base, a tool support having at least one bore extending through the support parallel with the said stop surface and unequally spaced from horizontal edges of the support, means for holding the tool support alternately in inverted positions, the said tool support being located between portions of the base each adapted to support a work piece so that the support together with the stop and the base provide three surfaces located on each of opposite sides of the support and adapted accurately to locate a work piece in relation to a tool receiving bore in the support, clamping means on each side of the tool support and means pivotally connecting each clamping means with the base for movement thereof through a right angle whereby each clamping means is adapted to press a work piece in turn against the stop surface and the tool support.

3. A dowel jig which comprises a base adapted to support an article which is to receive a dowel hole, a stop projecting upwards from the plane of the base and having a stop surface extending in a plane normal to and parallel with a rear edge of the base, a tool support having at least one bore having its axis parallel with both the said stop surface and the upper surface of the base and extending between opposite surfaces of the tool support, the said tool support being located between portions of the base each adapted in turn to support the work piece so that the support together with the stop and the base provide three surfaces located on each of opposite sides of the support and adapted accurately to locate a work piece in relation to a tool receiving bore in the support, a clamping means on each side of the tool support, and means pivotally connecting each clamping means with the base for movement thereof through a right angle whereby each clamping means is adapted to press a work piece in turn against the stop surface and the tool support.

References Cited in the file of this patent

UNITED STATES PATENTS

| | | |
|---|---|---|
| 809,069 | Lovett | Jan. 2, 1906 |
| 1,215,160 | Jenkins | Feb. 6, 1917 |
| 1,954,708 | Mass | Apr. 10, 1934 |